Nov. 29, 1955  E. LEYENDECKER  2,724,919
ORNAMENTAL PLASTIC OBJECT
Filed June 24, 1953
Fig.1.  Fig.2.  Fig.3.
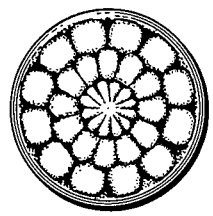 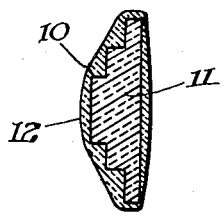 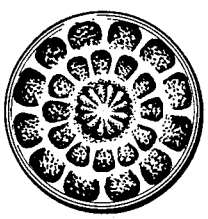
Fig.4.  Fig.5.  Fig.6.
 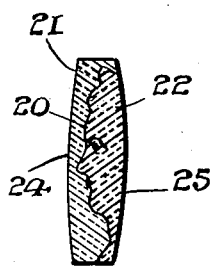 
Fig.7.  Fig.8.  Fig.9.
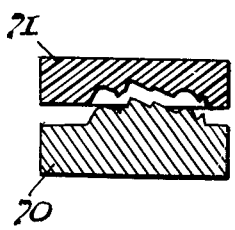 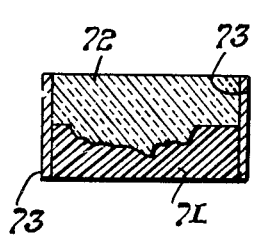 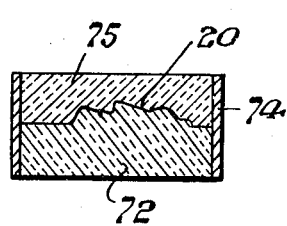
INVENTOR.
Ewald Leyendecker
BY Darby & Darby
ATTORNEYS.

United States Patent Office 2,724,919
Patented Nov. 29, 1955

2,724,919
ORNAMENTAL PLASTIC OBJECT

Ewald Leyendecker, Long Island City, N. Y.

Application June 24, 1953, Serial No. 363,877

3 Claims. (Cl. 41—24)

This invention relates to plastic articles and a method of preparing them and, in particular, to a form of plastic ornament which will have a cameo appearance from one face and an intaglio appearance from the other.

Stone-carving is an ancient art which has lost much of its appeal through modern commercialization of art forms, largely because the cost of producing the carved stone has rendered the article practically prohibitively expensive for use as part of costume jewelry. There exist a vast variety of carved stones as cameos or intaglio carvings in jewelers' collections, museums and libraries which could be rendered commercially valuable if their reproduction could be carried out in an inexpensive fashion.

The ornamental article of interest in the instant application consists of a plastic object, which when viewed from one face has a cameo appearance and when viewed from the other has an intaglio, and it is, accordingly, the basic object of the instant invention to provide a simple, convenient and inexpensive method of producing such articles.

It is another object of the invention to provide a simple, inexpensive method of reproducing detailed cameo carvings.

It is another object of the invention to provide a method of reproducing in detail intaglio objects.

Other objects and advantages of the invention will in part be obvious and in part appear hereinafter.

In accordance with the invention the method consists of forming a raised or cavity impression of the object to be reproduced in a material, such as plaster or wax, commonly used for such purposes, and forming from said impression the reproduction in a transparent plastic, preferably of the type which can be manipulated in liquid form and caused to set after it has been poured into a mold, stripping the set plastic from the mold, coating the impression formed in the plastic and subsequently forming over that impression another layer of the clear plastic to produce thereby a plastic object having essentially similar exterior faces, but having an internal pattern or film, which is a cameo when viewed from one side and an intaglio when viewed from the other. The invention, accordingly, is involved in the process comprising the manipulations and combinations of manipulations hereinafter set forth, and in the object having features and elements hereinafter described in greater detail.

Referring to the drawings,

Figures 1, 2 and 3 show a geometric design in plan, diametrical section and reverse views, respectively, to illustrate the cameo and intaglio effects obtained.

Figures 4, 5 and 6 illustrate, respectively, the object when worked out in a typical cameo type portrait where the figures represent the cameo, the cross section, and intaglio views, respectively.

Figures 7, 8 and 9 illustrate a stepwise operation in which the plastic material is formed into the desired finished object.

The types of plastic material used for making the clear reproductions of the intaglio and cameo figures are readily available under a variety of trade names. A common material is the methyl methacrylate monomer, which is perhaps the most popular of the clear resins. It is polymerized, sometimes by heating, but also by use of benzoyl peroxide as a catalyst, with the exclusion of air or other oxidation. The ideal conditions calling for the exclusion of air are specified, because it is in such circumstances that complete polymerization to a desired chain length is obtained.

Another monomer commonly available and used is allyl diglycol carbonate, which is likewise polymerized with benzoyl peroxide. Propylene percarbonate is another material which will give water clear castings, but has the disadvantage that it is explosive if not stored at a very low temperature such as maintainable only with Dry Ice.

Certain polyester resins are obtainable in the chemical trade as polyester monomers, and they are similarly polymerized with benzoyl peroxide, also preferably with the exclusion of air.

Where a resin monomer is to be used in the manipulation, the technique for forming the casting is to measure out the amount of the resin monomer needed for completing the particular casting just prior to use, and to add the needed amount of catalyst to bring about completion of the polymerization just before it is poured. The material, with the catalyst well mixed in, is then immediately poured into the mold, permitted to set, and such curing as is required is accomplished after the set resin is stripped from the mold. Setting time may vary considerably; the amount of catalyst used and the temperature determine the ultimate time. In general, it is best to permit slow setting, i. e. times from one to four hours, to avoid developing cracks or imperfections in the castings. For the resins mentioned, curing is effected by heating the casting to about 100° C. and maintaining it at that temperature for about 15 minutes to one hour. The time required varies with the size of casting.

It is also possible to use solutions of the clear polymerized resin to form the impression by applying a plurality of heavy coatings in a given mold, or by pouring a quantity of resin solution into a mold and drying. However, the preferable operation is to work with the monomer and to carry out the polymerization in the mold itself.

In general, the process consists of a series of steps which commence with the object it is desired to reproduce. For example, if it is desired to reproduce a fine cameo, an impression of the cameo is formed in wax or plaster, or a similar suitable material, to give a detailed, accurate reproduction of the cameo. The mold so formed from the cameo will give a cavity into which the liquid transparent resin monomer containing polymerizing catalyst is poured. After the resin sets, it is stripped free of the mold and there is thus obtained a transparent impression which duplicates the cameo on a base which may be about half the thickness of the final object. The impression is then gilded or painted the color desired, and around this gilded impression a raised frame or collar, of wax, plaster or paper is formed to the thickness desired in the ultimate object and transparent liquid resin monomer is poured over it. The cavity formed by the raised collar is thus filled in evenly on both sides with transparent plastic. After the material has set and been cured, the completely covered impression is machined and polished to the desired external shape, and shows the film from one face as a cameo impression, and from the other as an intaglio impression.

Where the operation starts with an intaglio mold the end product is similar, for the reproduction of the intaglio mold gives a raised impression around which the collar is built and the final casting made.

Referring to the drawings, specifically Figures 1, 2 and 3, it will be seen that Fig. 2 represents a cross-section through the geometric pattern reproduced, and it will appear that the outline 10, constituting the cross-sectional shape of the figure, is the outline of an intaglio mold. The plastic body 11 is cast in the mold, its face following the outline. Following this it is stripped free and its face is gilded or painted and, subsequently, the body 12 is cast over the gilded or painted face. When the object is finished off to the cross-sectional shape shown, it is observed that from one face it has the appearance of a cameo and from the other an intaglio, as shown in Figures 1 and 3, respectively.

In Figures 4, 5 and 6 a similar reproduction of a cameo type portrait is shown, there 20 in the cross-sectional view of Fig. 5 represents the outline or profile of the figure, and also represents the gilded or painted film between the halves 21 and 22 constituting the plastic body of the object. The precise geometric curvature 24 and 25 to be given to the external face is determined to suit the desires of the manufacturer.

In Figures 7, 8 and 9, the process of forming the impressions and molds is illustrated in diagrammatic form. In Fig. 7, 70 represents the cameo in section, and 71 the impression taken therefrom.

In Fig. 8, the impression 71 is shown filled with the liquid plastic 72 to form a raised reproduction thereof. Collar 73 holds the plastic in place.

In Fig. 9 the reproduction 72 is shown gilded and with a collar 74 formed around it to provide a cavity 75 in which additional plastic for forming the remainder of the object is poured.

It will be apparent from an inspection of the diagrams comprising Figures 1 through 6 that various combinations of cameo and intaglio designs can be made. For example, two cameo impressions of the same object or of different objects could be affixed together by causing the resin to set between the two halves carrying the cameo impressions. Similarly, a pair of intaglio impressions could be held together by a layer of clear resin. Combinations of cameos and intaglios of the same or different designs could be worked out and formed together in this fashion, for the only problem is to make certain that when the object is viewed from one face one design is seen and when viewed from the opposite side a different design is seen. Where different designs are to appear on opposite faces the opaque film within the body of the object should be substantially coextensive with the outline of the object in order that only one design may be seen from one face.

It is apparent that having made the impression, the contour portion may be painted in one color and the planar section forming it may be painted in a contrasting color or left unpainted. Also, in the painting, the paint film may be applied to the contour portion and such part of it as may inadvertently reach the planar section can be scraped or polished off. Left clear, the painted impression in the finished object has the outline of the design reproduced and is set in clear plastic.

The precise composition of paint film to be used may be varied as desired. It need only adhere to the plastic impression. For best adherence a paint having a film-forming ingredient of the same composition as the clear plastic, or of closely related composition may be used.

It is often convenient to work from a master model rather than from the original carving. In such a case a master pattern is made from the original carving using beeswax, which is a preferred material, and from this there is cast a plaster model. Following this, from the plaster model which serves in place of the original carving, wax molds can be made for production of the plastic objects themselves.

In accordance with customary technique in the formation of molds and the taking of wax impressions, it is desirable to use a very light dusting of extremely finely powdered talc on the original model before taking the wax impression, thereby avoiding the possibility of having the wax stick to the model. Since many original fine stone carvings have much fine detail, traces of sticking can spoil some of it in the impression.

The finishing of the object following the formation of the plastic impression from the mold can take several forms; that is the impression may be painted, gilded or metallized, and the frame or collar formed around it for casting the remainder. As an alternative procedure, it is possible to cement the first portion of the plastic impression to a clear plastic backing sheet rather than to cast plastic in that first portion of the plastic impression. Referring to Figures 8 and 9, this indicates that in the diagram shown in Fig. 9, rather than cast plastic in the cavity 75, a plastic sheet would be cemented over the face of the object, using a plastic or contrasting collar 74, likewise cemented to the impression 72.

For some purposes it may be desirable to cement the casting on a mother-of-pearl backing, after the pattern has been reproduced and set in the plastic.

In the manner described, cameos and intaglios of practically any degree of detail in their carving may be accurately reproduced. Inasmuch as the preparation of the molds for reproduction is a relatively easy operation and, once formed, they may be used repeatedly or even replaced without substantial cost, the process makes possible the reproduction of stone carvings of substantial historical interest in an accurate form and attractive enough to be used in costume jewelry.

Though the invention has been described in terms of only a limited number of specific examples, it is to be understood that variations thereof may be practiced without departing from the spirit or scope thereof.

What is claimed is:

1. An ornamental object simulating precious stones carved in cameo fashion with an ornamental design comprising, a cast body of clear plastic of substantial thickness having convex obverse and reverse faces, and having imbedded therein a continuous film of opaque material having convolutions therein to define the said ornamental design, said film reproducing the contour of said design and being substantially coextensive with the edges of said object whereby said object viewed from one face gives a cameo effect and viewed from the other, an intaglio effect.

2. The article in accordance with claim 1 in which the film has the convolutions of the design in one color and surrounding area in a different color.

3. The article in accordance with claim 2 wherein the film gives cameo and intaglio impression of the same design.

References Cited in the file of this patent

UNITED STATES PATENTS

| 2,240,900 | Bauer | May 6, 1941 |
| --- | --- | --- |
| 2,354,857 | Gits et al. | Aug. 1, 1944 |
| 2,451,913 | Brice | Oct. 19, 1948 |
| 2,511,552 | Stuempges | June 13, 1950 |
| 2,523,234 | Rado | Sept. 19, 1950 |